April 27, 1954

T. I. RESS 2,676,869

STYLUS MECHANISM

Filed Dec. 15, 1949

2 Sheets-Sheet 1

INVENTOR.
Thomas I. Ress
BY
Thiess, Olson & Mecklenburger
Att'ys

April 27, 1954 T. I. RESS 2,676,869

STYLUS MECHANISM

Filed Dec. 15, 1949 2 Sheets-Sheet 2

INVENTOR.
Thomas I. Ress
BY
Thiess, Olson & Mecklenburger
Att'ys

Patented Apr. 27, 1954

2,676,869

UNITED STATES PATENT OFFICE 2,676,869

STYLUS MECHANISM

Thomas I. Ress, Chicago, Ill., assignor to Consolidated Electric Company, Chicago, Ill., a corporation of Illinois Application December 15, 1949, Serial No. 133,152

4 Claims. (Cl. 346—139)

This invention relates to tele-autographic apparatus, more particularly to writing stylus mechanism for such apparatus and it is an object of the invention to provide improved mechanism of this character.

The tele-autographic apparatus used in connection with this invention may be as disclosed in Patent No. 2,583,535, issued January 29, 1952, to Robert Adler, and assigned to the same assignee as the present invention.

In writing apparatus such as that described in the application referred to, the writing of a message at one station, i. e. the transmitter, produces signals which are transmitted to a second station, i. e. the receiver, and causes reproduction there of the written message, the writing being done at both stations by means of a stylus engaging a writing surface such as paper, for example. The stylus and the writing surface, respectively, may be of any character such that a legible and relatively permanent record is made.

A well known form of stylus mechanism employs two electromagnet coils, one for elevating the stylus proper out of contact with the writing surface and the other for forcing the stylus into contact with the writing surface. Such a stylus mechanism is described and claimed in the application of Thomas I Ress, Serial No. 133,153, filed December 15, 1949, entitled Stylus Mechanism and System, and assigned to the same assignee as the present invention. The invention as shown in the drawings and described below is embodied in such a stylus mechanism but is applicable to many other types of stylus mechanisms.

Prior stylus mechanisms have been bulky and the link which connects the mechanism with the rest of the tele-autographic apparatus is located close to the writing surface, with the result that when the mechanism is in use as a transmitter it is difficult for the operator to observe the most important portion of the surface upon which he is writing. That is, it is difficult for the operator to observe the point of the stylus and to observe that portion of the surface upon which he has already written because of the interference of the stylus mechanism and the connecting link. The difficulty is continuously objectionable since the operator must depend largely on his sense of touch in the writing of words, for example. It is especially significant, however, when the operator momentarily lifts the sylus off the writing surface, as to cross a "t" or to dot an "i" and even to start a new word, since the operator has difficulty in seeing where he should reapply the stylus to the writing surface under these circumstances.

According to the invention, the connecting link, which must be substantially parallel to the writing surface for reasons apparent to those familiar with tele-autographic apparatus, is arranged at a substantial height with respect to the writing surface and the stylus mechanism is preferably made thin and elongate. This greatly increases visibility of the writing surface, and the advantage thus obtained is preserved through the employment of a novel stylus actuating arm of such a form that it may be pivoted on the connecting link and operate on the stylus near the writing tip thereof without obscuring that portion of the writing surface which may already have been written on and without substantially obscuring the tip of the stylus.

Accordingly, it is another object of the invention to provide an improved stylus mechanism and supporting link which substantially reduces visual obstruction of the writing surface upon which the stylus is used.

It is another object of the invention to provide an improved operating arm for a stylus mechanism resulting in a minimum of visual obstruction of the writing surface upon which the stylus mechanism is being used.

This invention, together with further objects and advantages thereof, will best be understood by reference to the following description taken in connection with the accompanying drawings, and its scope will be pointed out in the appended claims.

In the drawings, in which like parts are indicated by like reference numerals:

Figure 1:
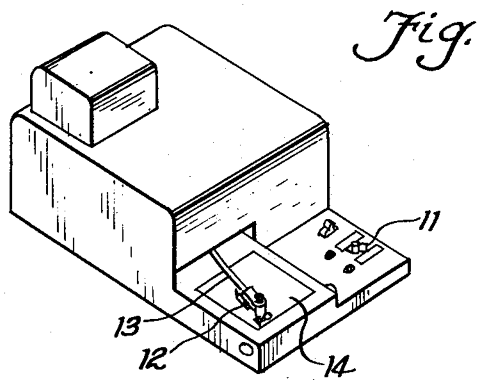
Fig. 1 is a perspective view of tele-autographic apparatus incorporating one embodiment of the invention.

The writing apparatus shown in Fig. 1 may be a combination transmitter and receiver for a tele-autographic system, a switch 11 being provided for transforming the apparatus from a receiver to a transmitter and vice versa. However, the invention is of particular advantage as applied to a transmitter, that is, where an operator is manually manipulating the stylus mechanism, and, accordingly, the ensuing description will be primarily concerned with such application of the apparatus.

A stylus mechanism 12 is shown in the drawings connected to and supported by a link 13, the stylus mechanism being arranged to be manually moved over a writing surface 14 when the apparatus is used as a transmitter. Movements of the stylus in writing on this surface are transmitted through the link 13 and transformed into suitable intelligence signals for transmission to another tele-autograph station, not shown, which functions as a receiver. Since the tele-autographic apparatus may be of any suitable design and, more specifically, may be as described in Patent No. 2,583,535 referred to above, it is not described in detail in this application.

Figure 2:
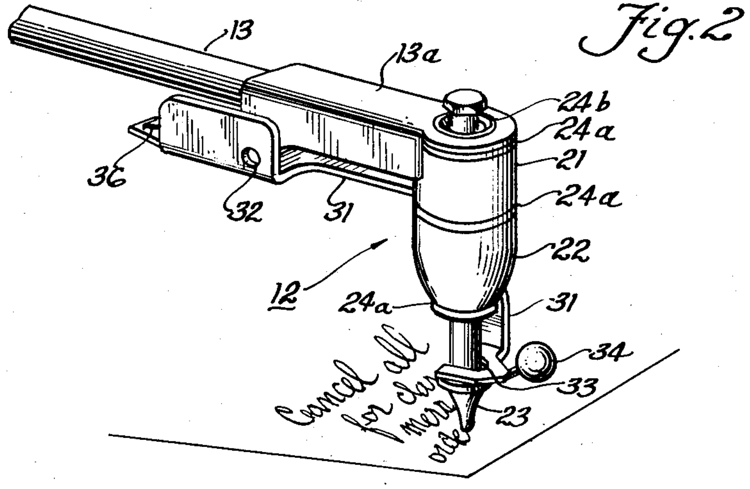
Fig. 2 is an enlarged perspective view of a stylus mechanism forming a part of the tele-autographic apparatus shown in Fig. 1.
Figure 3:
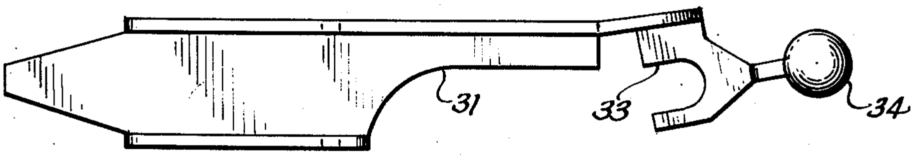
Fig. 3 is a plan view of an operating arm used in the stylus mechanism shown in Fig. 2.
Figure 4:
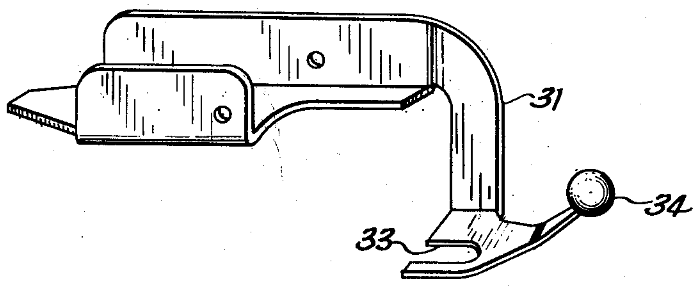
Fig. 4 is a perspective view of the operating arm illustrated in Fig. 3.
Figures 5, 6:
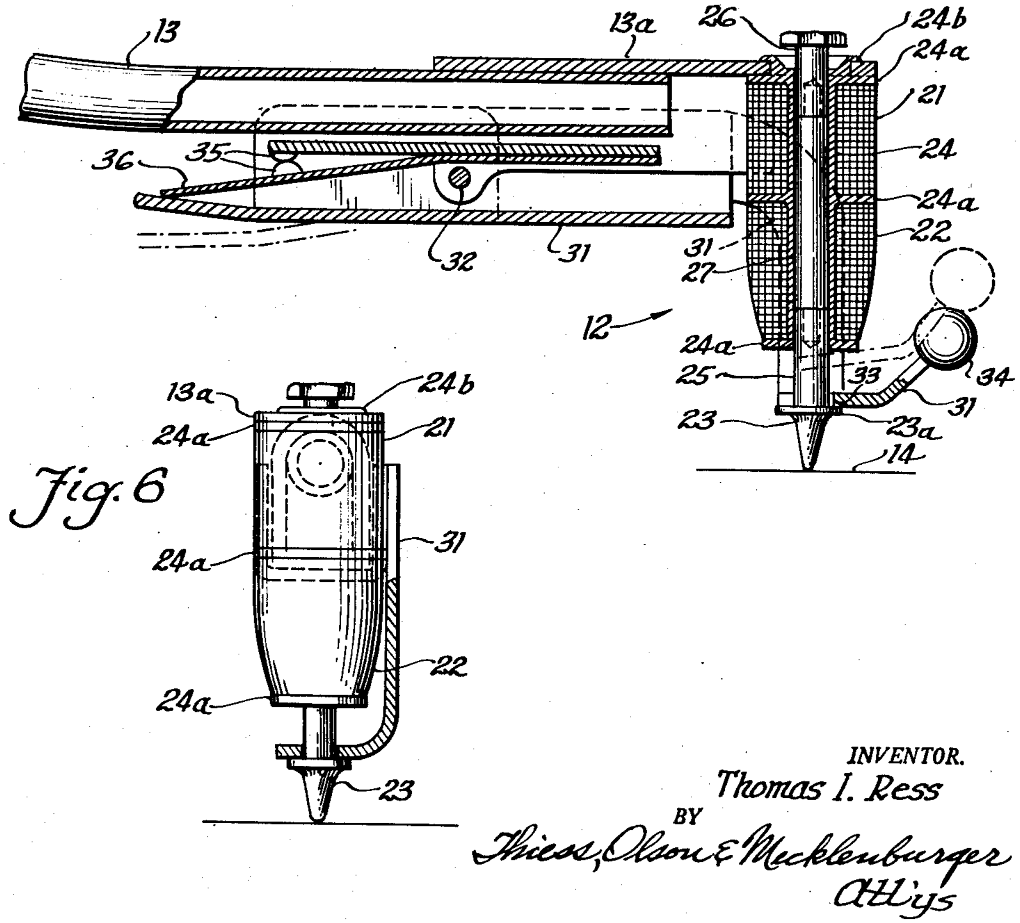
Fig. 5 is an elevational view, partially in cross section, of the stylus mechanism shown in Fig. 2.
Fig. 6 is an end elevational view of the same stylus mechanism, with a portion of the operating arm being shown in cross section.

The stylus mechanism, which is best seen in Figs. 2, 5, and 6, includes a pair of electromagnet coils 21 and 22 mounted on a nonmagnetic sleeve 24. This sleeve includes a cylindrical portion lining the inner surface of the coils, radially extending portions 24a at the ends of each coil, and a flange portion 24b through which the stylus mechanism is connected to and supported by the link 13 through a link extension 13a.

The shaft of the stylus 23 comprises a lower magnetic portion 25, an upper magnetic portion 26, and an intermediate nonmagnetic portion 27. When the stylus mechanism is utilized as a receiver, the two coils 21 and 22 may be alternatively energized to raise and lower the stylus as described and claimed in application Serial No. 133,153 referred to above. When the stylus mechanism is being used as a transmitter, the stylus 23 is continuously urged upwardly out of contact with the writing surface 14 by the coil 21.

An operating arm 31 is provided for manually forcing the point of the stylus 23 into contact with the writing surface 14 against the action of the coil 21, and to move the entire stylus mechanism in all directions across the writing surface during the writing operation.

The operating arm 31 is pivotally connected to the link 13 by a pin 32. From this point, the operating arm extends forwardly, closely adjacent the link 13, and then downwardly along one side of and closely adjacent the coils 21 and 22 of the stylus mechanism. The arm then bends inwardly under the coils at which point there is provided an open-ended slot 33 which fits snugly around the shank of the stylus 23. The arm then extends outwardly and preferably upwardly from the slotted portion and terminates in a ball 34. The ball 34 is one form of terminal which may be provided for convenient engagement with a writing stylus or handle, not shown in the drawings.

The stylus 23 has a shoulder 23a located immediately below the slotted portion of the operating arm and having a diameter larger than the width of the slot 33. Consequently, the operating arm 31, when forced downwardly by the operator, engages the shoulder 23a and forces the stylus down into contact with the writing surface.

A pair of switch contacts 35 are provided near the left-hand end of the operating arm 31, as seen in Fig. 5, the upper contact being stationary and the lower contact being mounted on a leaf spring 36. This spring urges the left-hand end of the operating arm downwardly and the right-hand end upwardly. When the operating arm is in the raised position, being held there normally by the spring 36, the contacts 35 are separated. However, when the operating arm is depressed, against the action of the spring 36, the contacts 35 are closed. These contacts may be employed to control the energization of coils corresponding to coils 21 and 22 at a remote tele-autograph station.

The invention being particularly applicable to a transmitter, it will be assumed that the electromagnet coil 21 is energized to urge the stylus 23 upwardly out of contact with the writing surface 14. When it is desired to transmit a message through operation of the stylus mechanism 12, a writing stylus or handle, not shown in the drawings but referred to above, is temporarily affixed to the ball 34 or other suitable terminus of the operating arm 31 and the operating arm is depressed. This brings the point of the stylus 23 into contact with the writing surface by virtue of the engagement of the slotted portion of the operating arm with the stylus shoulder 23a. Movements of the writing handle or stylus across the writing surface 14, that is to the left and right as the stylus is seen in Fig. 6, will be transmitted directly to the stylus by virtue of the snug fit of the shank of the stylus in the slot 33. Movements of the writing handle or stylus from the top to the bottom of the writing surface 14, that is to the left and the right as the stylus is seen in Fig. 5, are transmitted to the stylus mechanism through the pivot pin 32.

Since the operating arm is pivoted about an axis substantially above the stylus engaging portion thereof, a raising or lowering of the operating arm is accompanied by a substantial movement of the slotted portion thereof to the right and left, respectively, as seen in Fig. 5. Accordingly, a completely encircled opening in the operating arm, such as is commonly used for permitting passage therethrough of the shank of the stylus 23, would necessarily be of greater diameter, as measured to the left and right in Fig. 5, than the diameter of the shank of the stylus. Consequently, when the operating arm of such construction is lowered, that portion of the operating arm which encircles the shank of the stylus, would extend substantially to the left in Fig. 5 and obstruct the visibility of an important portion of the writing surface. In the slotted operating arm shown in the drawings, however, this view-obstructing portion of the arm is eliminated and at the same time this arm provides complete control over the stylus.

It will be apparent upon reference to Fig. 2 that the entire stylus mechanism 12 and supporting link 13 offer very little obstruction to visibility of the writing surface. Another cause of this high degree of visibility is the thin elongate stylus mechanism which results, in part, from the use of dual electromagnet coils. Still another cause of the high degree of visibility is the elevated supporting link 13, this link being connected to the stylus mechanism 12 adjacent the upper end thereof.

The gain in visibility through the use of these latter two features would be lost if the operating arm 31 were situated substantially below the supporting link 13 and to the rear of the stylus mechanism 12. This undesirable effect is avoided through the novel construction of the operating arm 31 which extends along the supporting link 13 closely adjacent thereto and then downwardly along one side of the coils 21 and 22. The operating arm preferably extends along the right-hand side of the stylus mechanism proper, as viewed in Fig. 6, in order that that portion of the arm may offer no visual obstruction to a right-handed operator.

Observation of Fig. 2 will reveal to one skilled with tele-autographic apparatus the significant advantages of the novel stylus construction illustrated. Only a small portion of the writing surface is obscured by the mechanism and the portion that is obscured is relatively unimportant, especially to a right-handed operator. The point of the stylus and the most important portion of the writing surface, namely that to the left and to the rear of the stylus, is clear and unobstructed.

The particular embodiment of the invention shown in the drawings and described above involves a double coil magnet but the invention is applicable to many types of stylus mechanisms. The mechanism is preferably thin and elongate, however, in order to offer little visual obstruction in itself and to permit the supporting link to be elevated a substantial distance off the writing surface.

While a particular embodiment of the invention has been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. In apparatus of the character described including a stylus mechanism which is relatively thin and elongated and a supporting link connected to said mechanism adjacent the end thereof which is remote from the writing surface, a non-view-obstructing operating arm engaging the stylus proper of said stylus mechanism and extending from the point of engagement therewith, near the writing end thereof, along and closely adjacent one side only of said mechanism and along a portion of the length of and closely adjacent said supporting link to a point thereon at which said arm is pivotally connected to said link.

2. In apparatus of the character described including a stylus mechanism which is relatively thin and elongated and a supporting link connected to said mechanism adjacent the end thereof which is remote from the writing surface, an operating arm having an open-ended slot within which the stylus proper of said stylus mechanism is positioned, said operating arm extending from the point of engagement with the stylus near the writing end thereof, along and closely adjacent one side only of said mechanism and along a portion of the length of and closely adjacent said supporting link to a point thereon at which said arm is pivotally connected to said link, said slot in said operating arm opening toward said point at which said arm is pivotally connected to said link.

3. In tele-autographic apparatus having a stylus mechanism for writing on a writing surface and a link member rigidly connected to and supporting said mechanism, said mechanism including an operating arm engaging the stylus proper near its writing end and adapted to force the stylus into engagement with and along such writing surface, the movement of said stylus mechanism being transmitted through said link to cause the generation of intelligence signals, and said link member extending substantially parallel to such writing surface with said stylus mechanism extending substantially normal thereto; the novel arrangement wherein said stylus mechanism is relatively thin and elongate and said link is connected to said mechanism adjacent the end thereof remote from such writing surface, and said operating arm is pivotally connected to said link member and extends along a portion of the length thereof and along substantially the entire length of said stylus mechanism at one side only thereof, whereby visual obstruction of such writing surface by said link member and said stylus mechanism is minimized.

4. In tele-autographic apparatus having a stylus mechanism for writing on a writing surface and a link member rigidly connected to and supporting said mechanism, said mechanism including an operating arm engaging the stylus proper near its writing end and adapted to force the stylus into engagement with and along such writing surface, the movement of said stylus mechanism being transmitted through said link to cause the generation of intelligence signals, and said link member extending substantially parallel to such writing surface with said stylus mechanism extending substantially normal thereto; the novel arrangement wherein said stylus mechanism is relatively thin and elongate and said link is connected to said mechanism adjacent the end thereof remote from such writing surface, and said operating arm is pivotally connected to said link member and extends along a portion of the length thereof and along substantially the entire length of said stylus mechanism at one side only thereof, said operating arm having an open-ended slot within which said stylus is positioned, said slot opening toward said point at which said arm is pivotally connected to said link, whereby visual obstruction of such writing surface by said link member and said stylus mechanism is minimized.

References Cited in the file of this patent

UNITED STATES PATENTS

| Number | Name | Date |
|---|---|---|
| 1,438,829 | Howell | Dec. 12, 1922 |
| 2,184,973 | Finch | Dec. 26, 1939 |
| 2,282,929 | Billstein | May 12, 1942 |
| 2,332,511 | Glassman et al. | Oct. 26, 1943 |